(12) United States Patent
Hwang

(10) Patent No.: US 8,970,494 B2
(45) Date of Patent: Mar. 3, 2015

(54) PORTABLE ELECTRONIC DEVICE AND METHOD OF CONTROLLING THE SAME

(75) Inventor: Jun-Sik Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 766 days.

(21) Appl. No.: 12/549,835

(22) Filed: Aug. 28, 2009

(65) Prior Publication Data

US 2010/0053083 A1 Mar. 4, 2010

(30) Foreign Application Priority Data

Sep. 1, 2008 (KR) ........................ 10-2008-0086007

(51) Int. Cl.
*G06F 3/03* (2006.01)
*G06F 3/038* (2013.01)
*G06F 3/041* (2006.01)

(52) U.S. Cl.
CPC ............... *G06F 3/038* (2013.01); *G06F 3/041* (2013.01)
USPC ........................................................ 345/158

(58) Field of Classification Search
None
See application file for complete search history.

(56) References Cited

U.S. PATENT DOCUMENTS

| 6,670,950 B1 * | 12/2003 | Chin et al. ................... 345/173 |
| 8,300,022 B2 * | 10/2012 | Brenneman et al. .......... 345/173 |
| 2003/0103091 A1 * | 6/2003 | Wong et al. ................... 345/863 |
| 2005/0190144 A1 * | 9/2005 | Kong ............................. 345/156 |
| 2005/0206789 A1 | 9/2005 | Takase |
| 2006/0197750 A1 * | 9/2006 | Kerr et al. ..................... 345/173 |
| 2007/0063976 A1 * | 3/2007 | Oga ............................... 345/168 |
| 2007/0182663 A1 * | 8/2007 | Biech ............................ 345/1.1 |
| 2007/0188450 A1 * | 8/2007 | Hernandez et al. .......... 345/158 |
| 2007/0229457 A1 * | 10/2007 | Sakurai ......................... 345/157 |
| 2008/0072163 A1 * | 3/2008 | Teng et al. .................... 715/761 |
| 2009/0096749 A1 * | 4/2009 | Kawahara et al. ........... 345/162 |
| 2009/0231662 A1 * | 9/2009 | Sorensson et al. ........... 359/273 |
| 2010/0020034 A1 * | 1/2010 | Kim ............................... 345/173 |

FOREIGN PATENT DOCUMENTS

| CN | 101465100 A | * 6/2009 | ............. G09G 3/34 |
| JP | 2005-303971 A | 10/2005 | |
| JP | 2007201727 A | * 8/2007 | ............. H04N 7/14 |
| JP | 2007-281864 A | 10/2007 | |
| KR | 10-2006-0066360 A | 6/2006 | |
| KR | 10-0652767 B1 | 12/2006 | |
| KR | 10-0654845 B1 | 12/2006 | |

* cited by examiner

*Primary Examiner* — Wayne Young
*Assistant Examiner* — Mark Fischer
(74) *Attorney, Agent, or Firm* — Birch, Stewart, Kolasch & Birch, LLP

(57) ABSTRACT

A portable electronic device including a first input/output unit including a monostable display element, a second input/output unit including a bistable display element, a main setting unit configured to selectively set either one of the first and second input/output units as a main input/output unit and the other one of the first and second input/output units as a sub input/output unit, and a conversion unit configured to convert the sub input/output unit into a touch pad for inputting a command on the main input/output unit.

12 Claims, 3 Drawing Sheets

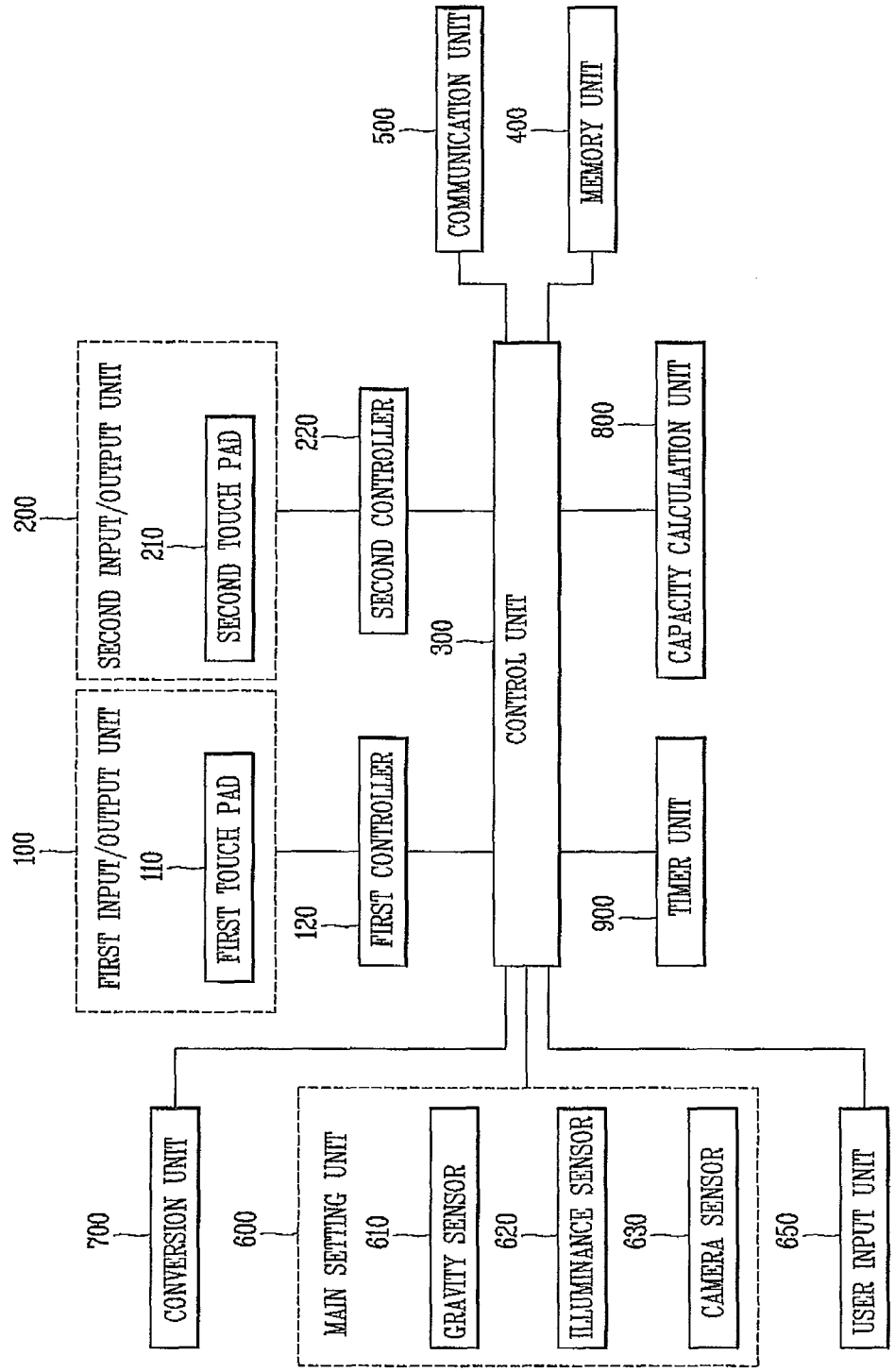

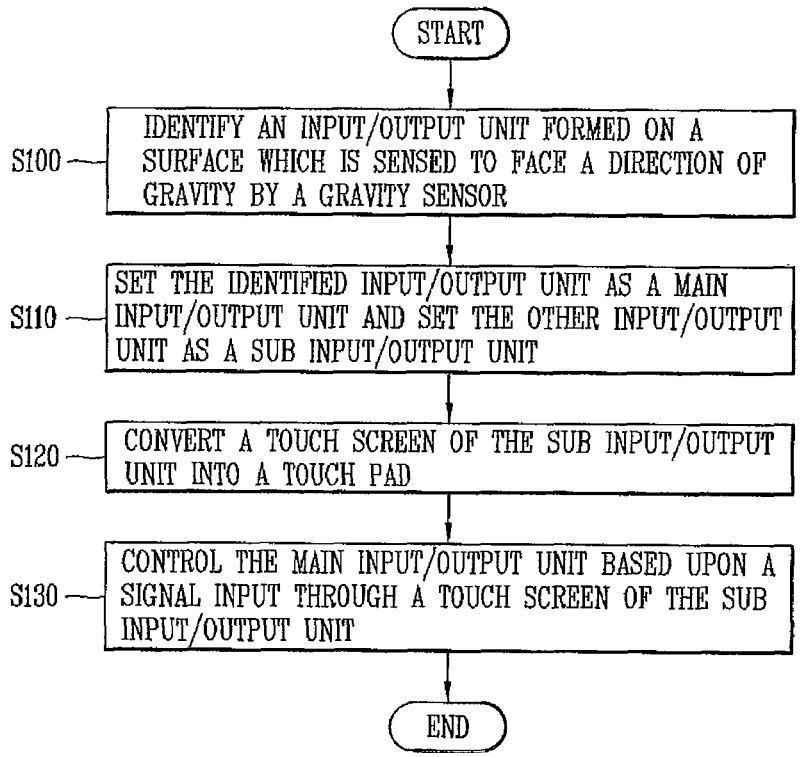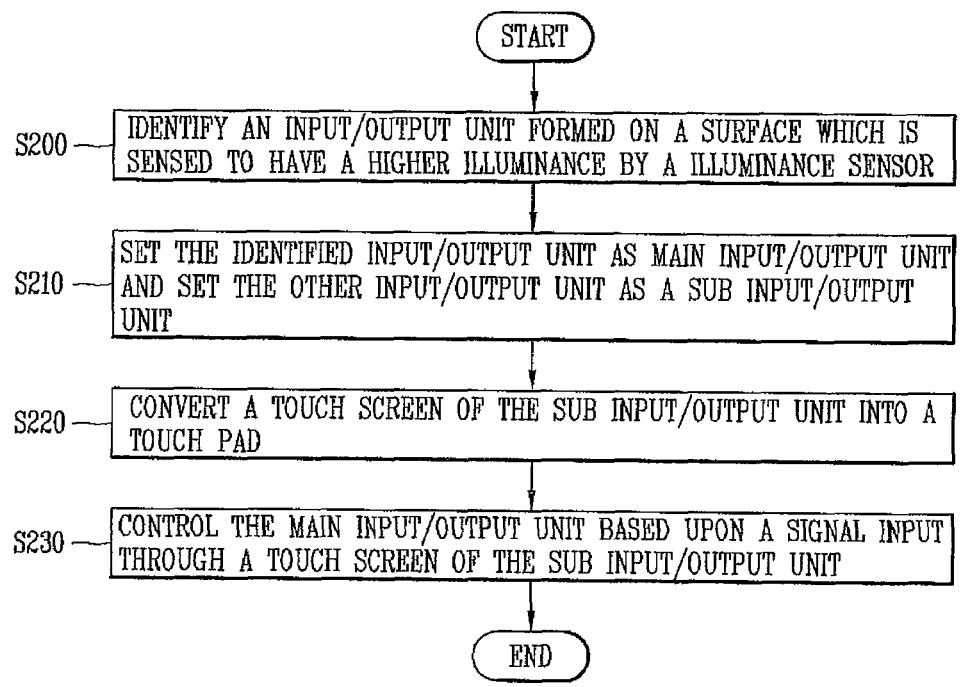

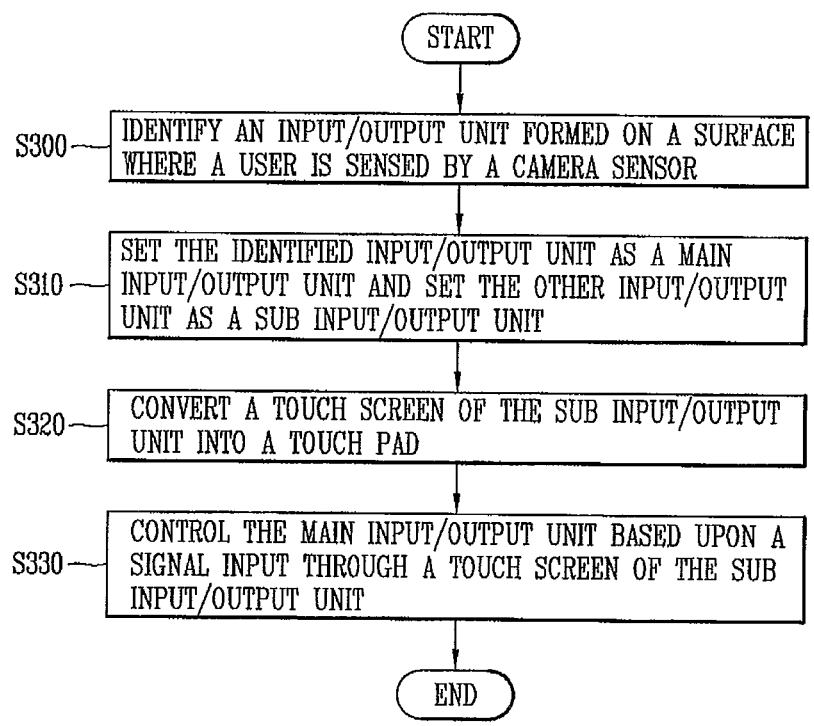

PORTABLE ELECTRONIC DEVICE AND METHOD OF CONTROLLING THE SAME

CROSS-REFERENCE TO A RELATED APPLICATION

Pursuant to 35 U.S.C. §119(a), this application claims the benefit of earlier filing date and right of priority to Korean Application No. 10-2008-0086007, filed on Sep. 1, 2008, the contents of which is incorporated by reference herein in its entirety. This application is also related to U.S. application Ser. No. 12/549,848, the entire contents of which is also incorporated by reference in its entirety.

BACKGROUND OF THE INVENTION

1. Field of the Invention

The present invention relates to a portable electronic device having two input/output units and a corresponding method of controlling the device.

2. Background of the Invention

Portable electronic devices are now very popular and provide many features. For example, portably electronic devices are used with home appliances, as mobile terminals, as broadcasting terminals, etc. For instance, mobile communication terminals provide various functions such as allowing users to view DMB (Digital Multimedia Broadcasting), play MP3 music files, take pictures, and the like in addition to typical communication functions such as audio communication. Users can also send and receive text messages, access the Internet, etc.

The portable electronic devices also include relatively small displays that display various information such as information downloaded from a server, information input by a user, and the like. In addition, the display unit included in the portable electronic device includes a CRT (cathode ray tube) display device and a flat panel display device such as LCD (liquid crystal display), PDP (plasma display panel), and the like. Some terminals also include a relatively new technology referred to as electronic paper (e-paper) displays. In more detail, the electronic paper displays includes organic thin-film transistors formed on a plastic substrate and a reflective bistable display element is formed thereon. However, the display unit included with the portable electronic device is limited in nature, making it inconvenient for the user.

SUMMARY OF THE INVENTION

Accordingly, one object of the present invention is to address the above-noted and other problems.

Another object of the present invention is to provide a novel portable electronic device and corresponding method that allows the user to easily view information on the device.

Yet another object of the present invention is to provide a novel portable electronic device and corresponding method that allows the user to easily operate the device using one hand.

To achieve these and other advantages and in accordance with the purpose of the present invention, as embodied and broadly described herein, the present invention provides in one aspect a portable electronic device including a first input/output unit including a monostable display element, a second input/output unit including a bistable display element, a main setting unit configured to selectively set either one of the first and second input/output units as a main input/output unit and the other one of the first and second input/output units as a sub input/output unit, and a conversion unit configured to convert the sub input/output unit into a touch pad for inputting a command on the main input/output unit.

In another aspect, the present invention provides a method of controlling a portable electronic device, and which includes displaying first information via a first input/output unit including a monostable display element, displaying second information via a second input/output unit including a bistable display element, selectively setting, via a main setting unit, either one of the first and second input/output units as a main input/output unit and the other one of the first and second input/output units as a sub input/output unit, and converting, via a conversion unit, the sub input/output unit into a touch pad for inputting a command on the main input/output unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram showing a portable electronic device according to an embodiment of the present invention;

FIG. 2 is a flow chart illustrating a method of controlling a portable electronic device according to an embodiment of the present invention;

FIG. 3 is a flow chart illustrating a method of controlling a portable electronic device according to another embodiment of the present invention; and FIG. 4 is a flow chart illustrating a method of controlling a portable electronic device according to still another embodiment of the present invention.

DETAILED DESCRIPTION OF THE INVENTION

Hereinafter, a preferred embodiment of a portable electronic device according to the present invention, as stated above, will be described in detail with reference to the accompanying drawings.

FIG. 1 is a block diagram showing a portable electronic device according to an embodiment of the present invention. As shown, the portable electronic device includes a first input/output unit 100 and a second input/output unit 200. The first input/output unit 100 and the second input/output unit 200 also respectively include a first touch pad 110 and a second touch pad 210. Further, in this embodiment, the first input/output unit 100 includes a monostable display element, and the second input/output unit 200 includes a bistable display element. In another embodiment, the first input/output unit 100 can include a bistable display element, and the second input/output unit 200 can include a monostable display element.

Further, the monostable and bistable display elements are classified by a transmissive state when an electric field is removed. In more detail, the monostable method is a display method in which when an electric field is removed, only one transmissivity is shown at all times regardless of the electric field signal that has been applied. On the other hand, the bistable method is a display method in which when an electric field is removed, two kinds of transmissivities such as black and white are shown according to the electric field signal that has been applied.

For instance, the monostable display element includes and LCD (liquid crystal display), PDP (plasma display panel), and the like, and the bistable display element includes e-paper, or electronic paper. Further, the electronic paper has an advantage of consuming low power by maintaining the image as it is even when there is no external signal input. In addition, the first input/output unit 100 and second input/output unit 200 receive a video signal from a first controller 120 and a second controller 220, respectively, to reproduce a video or moving image. The first controller 120 and second controller 220 also convert the data output from a control unit 300 into a video signal suitable for display, and transmit the converted data to the first input/output unit 100 and second input/output unit 200, respectively.

Further, the first input/output unit 100 may include an element for displaying a video signal having a higher frame rate than that of the second input/output unit 200. For instance, the first input/output unit 100 receives a video signal from the first controller 120 to reproduce multimedia content, and the second input/output unit 200 receives a video signal from the second controller 220 to reproduce the multimedia content related information or an electronic document. In addition, the multimedia content file, multimedia content related information data, and electronic document are stored in a memory unit 400. The memory unit 400 can be a non-volatile memory capable of writing or erasing data. For instance, the memory unit 400 can includes any one of EEPROM (Electrically Erasable Programmable Read Only Memory), Flash Memory, PRAM (Phase-change Random Access Memory), FRAM (Ferro-electric RAM), and MRAM (Magneto-resistive RAM).

When the first input/output unit 100 reproduces the multimedia content, the control unit 300 detects the multimedia content related information data and transmits the detected data the second controller 220. For instance, the control unit 300 can detect a file name of the multimedia content to detect the related information data from the memory unit 400. Further, the related information data transmitted to the second controller 220 by the control unit 300 is determined based on a kind of the multimedia content file.

In other words, if the multimedia content file is a music file, then the related information can include at least one or more of ID3 tag information, lyric information, and related article information. For instance, when music is reproduced by the first input/output unit 100, information such as title, composer, singer, and the like, of the music can be displayed by the second input/output unit 200. Further, the control unit 300 can detect information such as the title, composer, and singer, etc., from the song commentary information included in the ID3 tag information. In addition, journal article information such as lyrics information, music chart, broadcast appearance, etc. is displayed on the second input/output unit 200.

Furthermore, if the multimedia content file is a video file, then the related information can include at least one or more of subtitle information, film information, and related article information. For instance, when a film is reproduced by the first input/output unit 100, film information such as the title, producer, actor or actress, synopsis, etc. of the film, as well as subtitle information, is displayed by the second input/output unit 200. In addition, journal article information such as a film chart, number of audience, or the like can also be displayed on the second input/output unit 200.

Moreover, if the multimedia content file is an image file, then the related information can include at least one or more of EXIF (exchangeable image file format) information and user input information. For instance, when a photo is reproduced by the first input/output unit 100, EXIF information such as camera and lens information, a capture date, an exposure time, whether or not the flash is used, etc. of the photo can be detected and displayed on the second input/output unit 200. In addition, user input information including specific messages received from a user can be displayed on the second input/output unit 200.

Also, when the multimedia content is being reproduced through the first input/output unit 100, the control unit 300 detects the related information data from the memory unit 400 and transmits the data to the second controller 220. Further, the second controller 220 sequentially accumulates the related information data received from the control unit 300 to generate a video signal. In addition, sequentially accumulating the related information data means to sequentially reproduce a plurality of multimedia contents through the first input/output unit 100, or when the related information data is constituted by a plural number and sequentially detected, to cumulatively record by sequentially displaying from the related information data which has been initially detected to the related information data which has been finally detected.

For instance, if the multimedia content file is a music file, then the control unit 300 detects information such as music lyrics or the like from the memory unit 400 and transmits the detected information to the second controller 220, and the second controller 220 sequentially accumulates the related information data for sequentially displaying information such as music lyrics or the like that has been received from the control unit 300 through the second input/output unit 200.

Further, the video signal generated by using the related information data, which has been sequentially accumulated, is transmitted to the second input/output unit 200, and the second input/output unit 200 reproduces the related information as a type of an electronic document. In addition, the related information generated as a type of electronic document can be sequentially displayed on a page, or sequentially displayed on a plurality of pages by constructing each page respectively.

Furthermore, when a user input to a hyperlink object included in the electronic document is received while the electronic document is reproduced by the second input/output unit, the control unit 300 detects the link object content connected to the hyperlink object and transmits the detected link object and any needed corresponding information to the second controller 220. Further, the electronic document means the data having a document format which is written in an electronic form to be transmitted, received, or stored. Thus, if an electronic document such as electronic press or the like is reproduced by the second input/output unit 200, and when a hyperlink object displayed in any one format of text, image, background or underline attribute included in the electronic press is selected by a user, the first input/output unit 100 reproduces the link object content connected to the hyperlink object selected by the user.

In addition, the link object content includes any one or more of text, image, audio, and video data corresponding to the hyperlink object. For instance, when a user selects a specific word in an electronic document reproduced by the second input/output unit 200, the first input/output unit 100 reproduces an image or video content related to the selected word. Therefore, in the portable electronic device according to an embodiment of the present invention, the first input/output unit 100 can reproduce a color image that cannot be reproduced in the second input/output unit 200, which is provided with a black and white screen such as an electronic paper. Furthermore, there is an advantage that the first input/output unit 100 can reproduce video content, which is not reproducible in the second input/output unit 200 where only a video signal having a relatively low frame rate can be displayed.

When the link object content file is not stored in the memory unit 400, a communication unit 500 downloads the link object content file from a server. The communication unit 500 also downloads the link object content from a server using a hyperlink object information corresponding to the user input. For instance, when receiving a user input to the hyperlink object information underlined on a specific word from the user, the communication unit 500 downloads the link object content from the server using the word as a key word. Furthermore, when related information data of the multimedia content reproduced through the first input/output unit 100 is not stored in the memory unit 400, the communication unit 500 downloads the related information data from a server. In addition, the communication unit 500 downloads the related information data from a server using, for example, information included in a header portion of the multimedia content file.

The portable electronic device in FIG. 1 also includes a main setting unit 600 for setting a main input/output unit. In particular, the main setting unit 600 sets either one of the first input/output unit 100 and the second input/output unit 200 as the main input/output unit, and the other one as a sub input/output unit. Also, when a reproduction command for multimedia content or electronic document is received from a user, the main input/output unit is an input/output unit outputting a main video signal corresponding to the reproduction command. In addition, when either one of the first input/output unit 100 and the second input/output unit 200 is set to the main input/output unit, the sub input/output unit is the other input/output unit.

Further, a conversion unit 700 converts a touch screen of the sub input/output unit, which is set by the main setting unit 600, into a touch pad used for controlling the main input/output unit. For instance, when the first input/output unit 100 is set to the main input/output unit by the main setting unit 600, the converting unit 700 converts a touch screen of the second input/output unit 200 into a touch pad for controlling the first input/output unit 100. In addition, the conversion unit 700 moves a cursor on the main input/output unit or scrolls a screen based on a touch input to the touch screen of the sub input/output unit set by the main setting unit 600.

Further, the cursor on the main input/output unit can be moved by corresponding to the touch input in a one-to-one manner. For instance, when the first input/output unit 100 and the second input/output unit 200 are respectively provided in the front and rear sides of a main body of the portable electronic device according to one embodiment of the present invention, the input/output units can be set in such a way that points on a touch screen of the sub input/output unit respectively correspond to points by plane symmetry on the main input/output unit. In other words, an input to a specific position on the sub input/output unit by the user will be recognized as an input to a point corresponding to the specific position by plane symmetry on the main input/output unit. In addition, a cursor movement on the main input/output unit may be performed relatively based upon the touch input. For instance, a cursor on the main input/output unit is moved or a screen is scrolled based upon the relative position and speed of the user's input to a touch screen of the sub input/output unit.

Accordingly, there is an advantage that the user's convenience is increased by receiving the reproduction of a screen through the main input/output unit while at the same time utilizing a touch screen of the sub input/output unit as a touch pad. Further, when only the second input/output unit 200 includes a touch screen, and the first input/output unit 100 does not include a touch screen, the touch screen of the second input/output unit 200 is converted into a touch pad for an input of the user's command, only when the first input/output unit 100 is set to the main input/output unit.

In addition, as shown in FIG. 1, the main setting unit 600 includes a gravity sensor 610 for determining either one of the first input/output unit 100 and the second input/output unit 200 as the main input/output unit by sensing gravity. In particular, the main setting unit 600 sets an input/output unit formed on a surface which is sensed to face an opposite direction of gravity by the gravity sensor 610 as the main input/output unit. Further, in one embodiment, the first input/output unit 100 and the second input/output unit 200 are respectively formed on the front and rear sides of the portable electronic device main body, and the main setting unit 600 sets the input/output unit on a side facing an opposite direction of gravity as the main input/output unit by using gravity sensed through the gravity sensor 610.

For instance, when the first input/output unit 100 faces in a direction of gravity, and the second input/output unit 200 is formed on the opposite side of the first input/output unit 100, the main setting unit 600 sets the second input/output unit 200 facing an opposite direction of gravity as the main input/output unit. Furthermore, the conversion unit 700 converts a touch screen of the first input/output unit 100 into a touch pad for controlling the second input/output unit 200. Therefore, a user can perform a touch input for controlling the second input/output unit 200 through the first touch pad 110.

Moreover, as shown in FIG. 1, the main setting unit 600 includes an illuminance sensor 620 for determining either one of the first input/output unit 100 and the second input/output unit 200 as the main input/output unit by sensing a particular illuminance. In other words, an input/output unit formed on a surface where the illuminance is sensed to be higher by the illuminance sensor 620 is set as the main input/output unit. Thus, when the first input/output unit 100 and the second input/output unit 200 are respectively formed on the front and rear sides of the portable electronic device main body, the main setting unit 600 sets the input/output unit on a side having a higher illuminance as the main input/output unit by using an illumination sensed through the illuminance sensor 620.

For instance, when the first input/output unit 100 faces the ground, the second input/output unit 200 is formed on the opposite side of the first input/output unit 100, and the illumination of the first input/output unit 100 facing the ground is relatively low, the main setting unit 600 sets the second input/output unit 200, which has been sensed to have a relatively high illuminance, as the main input/output unit. Furthermore, the conversion unit 700 converts a touch screen of the first input/output unit 100 into a touch pad for controlling the second input/output unit 200. Therefore, a user can perform a touch input for controlling the second input/output unit 200 through the first touch panel 110.

In addition, as shown in FIG. 1, the main setting unit 600 also includes a camera sensor 630 for determining either one of the first input/output unit 100 and the second input/output unit 200 as the main input/output unit by sensing the user. In other words, the main setting unit 600 sets an input/output unit formed on a surface which is sensed to face in a direction of the user as the main input/output unit. The camera sensor 630 is also formed on a side of the surfaces where the first input/output unit 100 and the second input/output unit 200 are formed. Further, the camera sensor 630 sets the input/output unit on a side facing the user as the main input/output unit by sensing the user's eyes or shape.

For instance, when a user is sensed by the camera sensor 630 formed on a side of the surface where the first input/output unit 100 is formed, the main setting unit 600 sets the first input/output unit 100 facing the user side as the main input/output unit. Furthermore, the conversion unit 700 converts a touch screen of the second input/output unit 200 into a touch pad for controlling the first input/output unit 100. Therefore, a user can perform a touch input for controlling the first input/output unit 100 through the second touch pad 210. In addition, the main setting unit 600 includes an infrared sensor and may set either one of the first input/output unit 100 and the second input/output unit 200 as the main input/output unit by sensing the user through the infrared sensor.

In addition, as shown in FIG. 1, the portable electronic device also includes a user input unit 650 for receiving a user input for setting either one of the first input/output unit 100 and the second input/output unit 200 as the main input/output unit. In particular, the main setting unit 600 sets either one of the first input/output unit 100 and the second input/output unit 200 as the main input/output unit based upon a user input received by the user input unit 650. Further, the user input unit 650 may be formed in a button form on a side of a portable electronic device according to an embodiment of the present invention. Then, a user can set either one of the first input/output unit 100 and the second input/output unit 200 as the main input/output unit by manipulating the button. Also, when the first input/output unit 100 is set as the main input/output unit by a user's button manipulation, the conversion unit 700 converts a touch screen of the second input/output unit 200 into a touch pad for controlling the first input/output unit 100.

In addition, the touch screen is an input device in which points on a screen displayed through an input/output unit respectively correspond to points on the touch screen in a one-to-one manner, and an input through the touch screen is recognized as an input to a position on the screen corresponding to the relevant position. On the contrary, the touch pad is an input device for moving a cursor on the screen displayed on an input/output unit by receiving a touch input. Thus, the touch pad is driven in a different way from the touch screen in that it is not driven by a method of corresponding to points on the screen displayed through an input/output unit in a one-to-one manner.

Furthermore, the user input unit 650 may be constructed in a form of a touch input unit for receiving an input by the user's touch to a specific position of a portable electronic device according to an embodiment of the present invention. Also, the user sets either one of the first input/output unit 100 and the second input/output unit 200 as the main input/output unit through a touch to the touch input unit. In addition, the touch input unit can be formed at a position where the portable electronic device is grasped by a user to receive a touch input by a user. The touch input unit can also formed at a position of the left and right sides of the portable electronic device where it can be grasped by a user.

For instance, when the portable electronic device is grasped with a right hand by a user, the first input/output unit 100 formed on the front surface of the portable electronic device can be set to the main input/output unit by touching a touch input unit formed on the right side. Also, the conversion unit 700 converts a touch screen of the second input/output unit 200 into a touch pad for controlling the first input/output unit 100. In addition, when a touch input unit formed on the left side is touched with a right hand by a user, the second input/output unit 200 formed on the rear side of the portable electronic device is set to the main input/output unit. In addition, a touch screen of the first input/output unit 100 is converted into a touch pad for controlling the second input/output unit 200 by the conversion unit 700.

The control unit 300 also generates an idle screen information of the second input/output unit 200. In particular, the idle screen information corresponds to information constructing an idle screen displayed through the second input/output unit 200 in a state that the second input/output unit 200 enters an idle mode. The idle screen information can also include information on the remaining capacity of a battery and expected charge and discharge time, or the information on the current time and user schedule. Further, the idle screen information generated by the control unit 300 is transmitted to the second controller 220 and displayed through the second input/output unit 200. Furthermore, the control unit 300 turns off the power applied to the second input/output unit 200 for a predetermined time period after an idle screen is displayed on the second input/output unit 200 by the second controller 220. This is to reduce power consumption by using the characteristic of the second input/output unit 200 which is provided with a bistable display element. In other words, the second input/output unit 200 maintains the final image as it is even when the external signal input has been removed, thereby turning off the power applied in a state that idle screen information is displayed to reduce power consumption.

Furthermore, when the second input/output unit 200 enters an idle mode, the control unit 300 updates the idle screen information with a predetermined time period and transmits the information to the second controller 220. This is to provide changed information to the user after a predetermined time has passed, because an idle screen displayed through the second input/output unit 200 is in a state that the final image just before removing the external signal input is maintained as it is. Accordingly, after updating the idle screen displayed through the second input/output unit 200, the control unit 300 turns off the power applied to the second input/output unit once again, thereby minimizing power consumption.

The remaining capacity of a battery constituting the idle screen information is also measured by a capacity calculation unit 800. In particular, the capacity calculation unit 800 measures the remaining capacity of a battery to calculate the expected charge and discharge time. Further, the control unit 300 generates the idle screen information by using the remaining capacity of a battery through the capacity calculation unit 800 and the calculated expected charge and discharge time. The control unit 300 also displays the remaining capacity and the expected charge and discharge time with graphic images in a form of bar, scale, and diagram as well as along with time-unit designators in a form of number notation.

Further, the current time and user schedule information constituting the idle screen information are provided by a timer unit 900 and the memory unit 400. In particular, the timer unit 900 provides current time information, and the memory unit 400 stores schedule information established by a user. In addition, the control unit 300 generates idle screen information by using the user schedule information stored in the memory unit 400 and the current time information provided by the timer unit 900. The control unit 300 also displays the current time along with the user schedule based on time.

In addition, when the main setting unit 600 sets either one of the first input/output unit 100 and the second input/output unit 200 as the main input/output unit, and sets the other one as the sub input/output unit, the control unit 300 determines that an input/output unit already set as the sub input/output unit by the main setting unit 600 enters an idle mode. Accordingly, when the first input/output unit 100 is set as the main input/output unit by the main setting unit 600, the second input/output unit 200 displays an idle screen. Furthermore, when multimedia content is reproduced through the first input/output unit 100 according to the user's setting, the control unit 300 may determine that the second input/output unit 200 enters into an idle mode. Thus, when identifying the multimedia content being reproduced through the first input/output unit 100, the control unit 300 generates idle screen information of the second input/output unit 200. Furthermore, the second controller 220 receives the idle screen information from the control unit 300 and displays an idle screen on the second input/output unit 200.

Moreover, when a power end signal is received by the control unit 300, the control unit 300 determines that the second input/output unit 200 enters into the idle mode. Further, the power end signal corresponds to a signal to end the main power of the portable electronic device according to an embodiment of the present invention. In other words, when all or most of the electrical capacity of a battery of the terminal has been consumed, the control unit 300 receives the power end signal to generate the idle screen information of the second input/output unit 200. Furthermore, the second controller 220 receives the idle screen information from the control unit 300 and displays an idle screen on the second input/output unit 200.

In addition, when the power end signal is received, the second input/output unit 200 is determined to be entered into an idle mode and specific information is displayed through the second input/output unit 200 in a state of the idle mode. In other words, the second input/output unit 200 includes the bistable display element, and therefore, specific information is continuously provided to the user by maintaining the final image for a specified period of time even when a signal ending the main power of the portable electronic device is received and the power application is cut off.

As a result, in a portable electronic device according to an embodiment of the present invention, there is an advantage that power consumption is reduced by displaying an idle screen through the input/output unit of an electronic paper, the current power state of a portable electronic device is seen by updating an idle screen with a specified time period, and the schedule management is possible based on a current time.

Next, a method of controlling a portable electronic device according to an embodiment the present invention will be described in detail with reference to FIGS. 2-4. FIG. 1 will also be referred to throughout the rest of the description of embodiments of the present invention. In particular, FIG. 2 is a flow chart illustrating a method of controlling a portable electronic device according to an embodiment of the present invention. As illustrated in FIG. 2, the method begins with identifying an input/output unit formed on a surface which is sensed to face an opposite direction of gravity by the gravity sensor 620 (S100).

Thus, in this embodiment, either one of the first input/output unit 100 and the second input/output unit 100 is determined as the main input/output unit by sensing gravity through the gravity sensor 610. In other words, a surface which is sensed to face a direction of gravity and a surface which is sensed to face an opposite direction of gravity is determined of the first input/output unit 100 and the second input/output unit 200. Further, according to one embodiment of the present invention, the first input/output unit 100 and the second input/output unit 200 are respectively formed on the front and rear sides of the portable electronic device main body.

In addition, the first input/output unit 100 includes an element for displaying a video signal having a relatively higher frame rate than that of the second input/output unit 200. Also, the first input/output unit 100 includes a monostable display element, and the second input/output unit 200 includes a bistable display element. Moreover, the first input/output unit 100 includes a typical display element (e.g., LCD), and the second input/output unit 200 includes an electronic paper display element. In particular, as discussed above, the electronic paper is a bistable display in which an image is maintained as it is when there is no external signal input, thereby having an advantage of consuming low power.

Next, as shown in FIG. 2, an input/output unit formed on a surface which is sensed to face an opposite direction of gravity is set as the main input/output unit, and an input/output unit facing the other direction is set as the sub input/output unit (S110). Further, as discussed above, the main input/output unit is an input/output unit for outputting a main video signal based upon a reproduction command received from the user, and the sub input/output unit is an input/output unit which is not set as the main input/output unit. In other words, the first input/output unit and the second input/output unit are respectively formed on the front and rear sides of the portable electronic device main body, and as a result, the input/output unit on a side facing an opposite direction of gravity is set as the main input/output unit, and the input/output unit on a side facing a direction of gravity is set as the sub input/output unit by using gravity sensed through the gravity sensor 610.

For instance, when the first input/output unit 100 faces a direction of gravity, and because the second input/output unit 200 is formed on the opposite side of the first input/output unit 100, the second input/output unit 200 facing an opposite direction of gravity is set as the main input/output unit. Then, as shown in FIG. 2, a touch screen of the sub input/output unit is converted into a touch pad (S120). Further, as discussed above, the touch pad is driven in a different way from the touch screen in that it is not driven by a method of corresponding to points on the screen displayed through an input/output unit in a one-to-one manner.

As a result, the user may perform a scroll function when reproducing an electronic document by utilizing a touch screen of the sub input/output unit as a touch pad instead of a touch screen of the main input/output unit. Particularly, when the first input/output unit 100 and the second input/output unit 200 are respectively formed on the front and rear sides of the portable electronic device, the user can perform a touch input through the sub input/output unit instead of performing a touch input through the main input/output unit, thereby having an advantage that a grasp and touch input of the portable electronic device can be performed with only one hand.

Next, as shown in FIG. 2, the main input/output unit is controlled based upon a signal received through a touch screen of the sub input/output unit (S130). Further, the main input/output unit is controlled by moving a cursor on the main input/output unit based upon a touch input on the touch screen of the sub input/output unit or by scrolling a screen. For instance, when the first input/output unit 100 and the second input/output unit 200 are respectively provided on the front and rear sides of portable electronic device main body, the input units can be set in such a way that points on a touch screen of the sub input/output unit respectively correspond to points by plane symmetry on the main input/output unit. In other words, an input to a specific position on a touch screen of the sub input/output unit will be recognized as an input to a point corresponding to the specific position by plane symmetry on the main input/output unit.

As a result, according to a method of controlling a portable electronic device according to an embodiment of the present invention, there is an advantage that the user's convenience can be promoted because the user can view a screen reproduction through the main input/output unit while at the same time performing a touch input by using a touch screen of the sub input/output unit.

Next, FIG. 3 is a flow chart illustrating a method of controlling a portable electronic device according to another embodiment of the present invention. As illustrated in FIG. 3, the method begins with identifying an input/output unit formed on a surface which is sensed to have a higher illuminance by the illuminance sensor 620 (S200).

Then as shown in FIG. 3, an input/output unit formed on a surface which is sensed to have a higher illuminance is set to the main input/output unit, and the other input/output unit is set to the sub input/output unit (S210). Further, the main input/output unit is an input/output unit outputting a main video signal, and as stated above, it means an input/output unit on a side where the content is reproduced based upon the user's input. Subsequently, a touch screen of the sub input/output unit is converted into a touch pad (S220). Accordingly, when the first input/output unit 100 and the second input/output unit 200 are respectively formed on the front and rear sides of the portable electronic device, the user can perform a touch input through the sub input/output unit instead of performing a touch input through the main input/output unit, thereby having an advantage that a grasp and touch input of the portable electronic device can be performed with only one hand.

Next, as shown in FIG. 3, the main input/output unit is controlled based upon a signal received through a touch screen of the sub input/output unit (S230). Further, the main input/output unit is controlled by moving a cursor on the main input/output unit based upon a touch input on the touch screen of the sub input/output unit or by scrolling a screen. When the first input/output unit 100 and the second input/output unit 200 are respectively provided in the front and rear sides of the portable electronic device main body, the units can be set in such a way that points on a touch screen of the sub input/output unit respectively correspond to points by plane symmetry on the main input/output unit.

As a result, according to a method of controlling a portable electronic device according to an embodiment of the present invention, there is an advantage that the user's convenience can be promoted because the user can view a screen reproduction through the main input/output unit while at the same time performing a touch input by using a touch screen of the sub input/output unit.

Next, FIG. 4 is a flow chart illustrating a method of controlling a portable electronic device according to still another embodiment of the present invention. As illustrated in FIG. 4, the method begins with identifying an input/output unit formed on a surface where a user is sensed by the camera sensor 630 (S300). Further, the camera sensor 630 is formed on a side of the surfaces where the first input/output unit 100 and the second input/output unit 200 are formed. Also, of the first input/output unit 100 and the second input/output unit 200, the camera sensor 630 sets an input/output unit facing the user side as the main input/output unit. For instance, when a user is sensed by the camera sensor 630 formed on a side of the surface where the first input/output unit 100 is formed, the first input/output unit 100 facing the user side is set as the main input/output unit.

Next, as shown in FIG. 4, an input/output unit formed on a surface where a user is sensed by the camera sensor 630 is set as the main input/output unit, and the other input/output unit is set as the sub input/output unit (S310). Subsequently, a touch screen of the sub input/output unit is converted into a touch pad (S320). Further, the first input/output unit 100 and the second input/output unit 200 are respectively formed on the front and rear sides of the portable electronic device, and therefore, the user can perform a touch input through the sub input/output unit instead of performing a touch input through the main input/output unit, thereby having an advantage that a grasp and touch input of the portable electronic device can be performed with only one hand.

Next, the main input/output unit is controlled based upon a signal received through a touch screen of the sub input/output unit (S330). In addition, the main input/output unit is controlled by moving a cursor on the main input/output unit based upon a touch input on the touch screen of the sub input/output unit or by scrolling a screen. As a result, an input/output unit where a user wants to control can be discerned by sensing the user through the camera sensor 630, thereby having an advantage that an input/output unit is controlled while at the same time reproducing a screen.

Thus, embodiments of the present invention advantageously improve the user's view of information on the displays, and allow the user to accurately input information when performing a touch input using a touch screen while at the same time reproducing multimedia content through a display unit provided in a portable electronic device.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:
1. A portable electronic device, comprising:
 a first input/output unit formed on a front side of the portable electronic device;
 a second input/output unit formed on a rear side of the portable electronic device;
 a camera sensor formed on at least one of the front side and the rear side, and configured to sense a user;
 a main setting unit configured to:
 determine one of the first input/output unit and the second input/output unit as a main input/output unit based on a result of the sense, wherein a side comprising the main input/output unit corresponds to a side facing the user among the front side and the rear side; and
 set another one different from the one of the first input/output unit and the second input/output unit as a sub input/output unit for receiving user input associated with contents output on the main input/output unit,
 wherein the contents output on the main input/output unit are controlled based on the user input received via the sub input/output unit.
2. The portable electronic device of claim 1,
 further comprising a sensor unit having a gravity sensor configured to sense gravity.
3. The portable electronic device of claim 1,
 further comprising a sensor unit having an illuminance sensor configured to sense an amount of illuminance.

4. The portable electronic device of claim 1, wherein the first input/output unit and second input/output unit respectively include a first display element and a second display element for displaying a video signal having a different frame rate from each other.

5. The portable electronic device of claim 4, wherein the second display element is an electronic paper display element.

6. The portable electronic device of claim 1, further comprising a user input unit for receiving a user input to set the main input/output unit,
wherein the main setting unit sets either one of the first input/output unit or the second input/output unit as the main input/output unit according to the user input received through the user input unit.

7. A method of controlling a portable electronic device, the method comprising:
displaying first information via a first input/output unit formed on a front side of the portable electronic device;
displaying second information via a second input/output unit formed on a rear side of the portable electronic device;
sensing, via a camera sensor formed on at least one of the front side and the rear side, a user;
determining, via a main setting unit of the portable electronic device, one of the first input/output unit and the second input/output unit as a main input/output unit based on a result of the sensing, wherein a side comprising the main input/output unit corresponds to a side facing the user among the front side and the rear side; and
setting another one different from the one of the first input/output unit and the second input/output unit as a sub input/output unit for receiving user input associated with contents output on the main input/output unit,
wherein the contents output on the main input/output unit are controlled based on the user input received via the sub input/output unit.

8. The method of claim 7, further comprising a sensor unit having a gravity sensor configured to sense gravity.

9. The method of claim 7, further comprising a sensor unit having an illuminance sensor configured to sense an amount of illuminance.

10. The method of claim 7, wherein the first input/output unit and second input/output unit respectively include a first display element and a second display element for displaying a video signal having a different frame rate from each other.

11. The method of claim 10, wherein the second display element is an electronic paper display element.

12. The method of claim 7, wherein the portable electronic device comprises a user input unit to set the main input/output unit, and
wherein the main setting unit sets either one of the first input/output unit or the second input/output unit as the main input/output unit according to the user input received through the user input unit.

* * * * *